(12) United States Patent
Krentz et al.

(10) Patent No.: US 10,987,828 B2
(45) Date of Patent: Apr. 27, 2021

(54) CONCRETE PRODUCT MACHINE MOLD ASSEMBLY STRIPPER HEAD SUPPORT

(71) Applicant: Besser Company, Alpena, MI (US)

(72) Inventors: Douglas Krentz, Alpena, MI (US); Devin Kendziorski, Alpena, MI (US)

(73) Assignee: Besser Company, Alpena, MI (US)

( * ) Notice: Subject to any disclaimer, the term of this patent is extended or adjusted under 35 U.S.C. 154(b) by 0 days.

(21) Appl. No.: 16/407,655

(22) Filed: May 9, 2019

(65) Prior Publication Data

US 2019/0351580 A1 Nov. 21, 2019

Related U.S. Application Data

(60) Provisional application No. 62/671,631, filed on May 15, 2018.

(51) Int. Cl.
*B28B 7/00* (2006.01)
*F16B 1/00* (2006.01)
*B28B 13/06* (2006.01)

(52) U.S. Cl.
CPC ............. *B28B 13/06* (2013.01); *B28B 7/002* (2013.01); *B28B 7/0014* (2013.01); *F16B 2001/0035* (2013.01)

(58) Field of Classification Search
CPC .................................................... B28B 7/002
See application file for complete search history.

(56) References Cited

U.S. PATENT DOCUMENTS

| 2,521,885 | A * | 9/1950 | Vasquez | E05C 19/16 292/251.5 |
| 10,304,429 | B1 * | 5/2019 | Broadbelt | G10D 13/28 |
| 2016/0032954 | A1 * | 2/2016 | Porter | H01F 7/0252 24/303 |
| 2016/0189844 | A1 * | 6/2016 | Yajima | H01F 7/0257 335/285 |
| 2017/0073904 | A1 * | 3/2017 | McDowell | F16B 5/10 |
| 2017/0276159 | A1 * | 9/2017 | Robinson | A47B 13/021 |

OTHER PUBLICATIONS

Besser drawing disclosing a known concrete product machine mold assembly arrangement manufactured and sold by the applicant, Besser.

* cited by examiner

*Primary Examiner* — Marc C Howell
*Assistant Examiner* — John J DeRusso
(74) *Attorney, Agent, or Firm* — Reising Ethington P.C.

(57) ABSTRACT

A device for supporting stripper head on a mold box of a concrete product machine mold assembly. The device includes a set of attachment hardware that connects a stand-off leg to a stripper head plate to support the stripper head with the stripper head plungers disposed in respective protected positions within respective plunger receptacles of the mold box. The hardware set comprises a ferrous metal portion configured to be carried by the stripper head plate and a magnetic portion carried by the stand-off leg in a position to magnetically engage the ferrous metal portion and allow for removable attachment of the stand-off leg to the stripper head plate when the ferrous metal portion is carried by the stripper head plate.

7 Claims, 4 Drawing Sheets

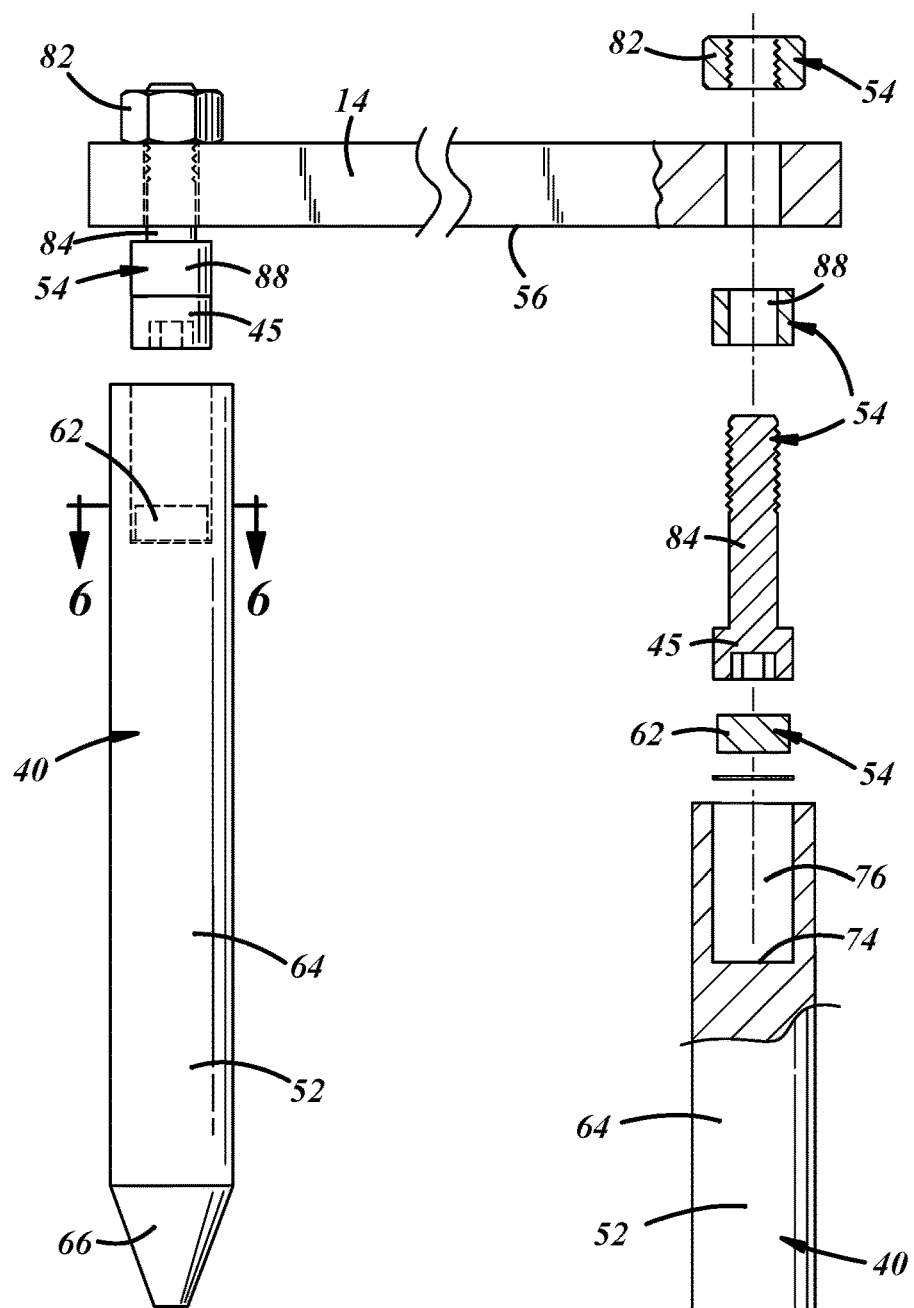
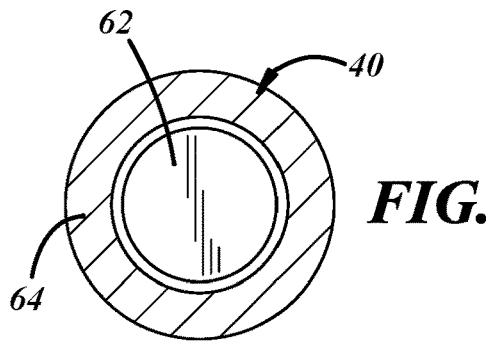
FIG. 5
FIG. 6

CONCRETE PRODUCT MACHINE MOLD ASSEMBLY STRIPPER HEAD SUPPORT

CROSS-REFERENCES TO RELATED APPLICATIONS

This application claims the benefit of the filing date of U.S. Provisional Patent Application Ser. No. 62/671,631 filed May 15, 2018.

STATEMENT REGARDING FEDERALLY SPONSORED RESEARCH OR DEVELOPMENT

Not Applicable

BACKGROUND

Field

This application relates generally to a support device for a stripper head in a mold assembly of a concrete product manufacturing machine.

Description of Related Art Including Information Disclosed Under 37 CFR 1.97 and 1.98

When a mold assembly is in use in a concrete product making machine, machine components such as head clamp bars engage and support a mold assembly stripper head in a working position relative to a mold assembly mold box. When the head clamp bars are disconnected and there is nothing supporting the stripper head in its working position, the stripper head can drop into a position within the mold box where plunger portions of the stripper head extend below a base plane of the mold box, which can make it difficult to lift the stripper head out of the mold box. When the stripper head is in this position within the mold box it can also be more difficult to safely transport and store the mold assembly since portions of the stripper head plunger portions extending below the base plane of the mold box, are exposed and susceptible to damage.

As shown in FIG. 1, it is known for a stripper head 10 of a concrete product making machine mold assembly 12 to comprise a stripper head plate 14 and one or more stripper head plungers 16 supported on and extending downwardly from the stripper head plate 14. It's also known for a concrete product making machine mold assembly 12 to include a mold box 20, which may include one or more mold cavity plunger receptacles 22 for receiving the stripper head plungers 16 when the stripper head 10 is lowered into a working position relative to the mold box 20 as shown in FIG. 2. Stand-off legs 24 may be removably attached to an underside of the stripper head plate 14 in respective positions extending downwardly from the stripper head plate 14 to engage an upper surface of the mold box 20 and supporting the stripper head 10 in a position with the stripper head plungers 16 disposed in protected positions within the respective plunger receptacles 22 for removal, transport, and storage of the mold assembly 12. Each stand-off leg 24 has a threaded bore in an upper end for receiving a bolt 28 in threaded engagement, and the stripper head plate 14 includes four holes 30 for receiving the respective bolts 28 and attaching the respective stand-off legs 24. The bolts 28 are used to attach the stand-off legs 24 to the stripper head plate 14 and must be removed before the stand-off legs 24 can be detached from the stripper head plate 14.

SUMMARY

A stripper head support device is provided for supporting a stripper head of a concrete product machine mold assembly, on a mold box of the mold assembly. The stripper head comprises a stripper head plate and stripper head plungers supported on and extending downwardly from the stripper head plate, and where the mold box has plunger receptacles for receiving the stripper head plungers when the stripper head is lowered into a working position relative to the mold box. The stripper head support device comprises a stand-off leg and a leg attachment that is configured to connect the stand-off leg to the stripper head plate in a position extending downwardly from the stripper head plate such that a lower end of the stand-off leg will engage an upper surface of the mold box of the mold assembly and support the stripper head on the mold box in a raised position above the working position, with the stripper head plungers disposed in respective protected positions within the respective plunger receptacles of the mold box. The stripper head support device also comprises a fastener attachable to the stripper head plate of a mold assembly stripper head, a magnet fixed to either the fastener in a position to releasably magnetically engage a ferrous metal or magnetic portion of the stand-off leg, or the stand-off leg in a position to releasably magnetically engage a ferrous metal or magnetic portion of the fastener.

DRAWING DESCRIPTIONS

These and other features and advantages will become apparent to those skilled in the art in connection with the following detailed description and drawings of one or more embodiments of the invention, in which:

FIG. 1 is an orthogonal view of a prior art concrete product machine mold assembly showing a stripper head of the assembly spaced above a mold box of the assembly, and also showing one of four prior art stripper head support devices shown unfastened from a stripper head plate of the stripper head;

FIG. 2 is an orthogonal view of the concrete product machine mold assembly of FIG. 1 showing the stripper head support devices of FIG. 1 supporting the stripper head on the old box of FIG. 1, FIG. 3 is an orthogonal view of the stripper head support devices and stripper head plate of FIG. 2, and including an axially exploded view of one of four stripper head support devices constructed according to an embodiment of the present invention.

FIG. 5 is a fragmentary front view of the stripper head plate and two of the stripper head support devices of FIG. 4, with a stand-off leg of one of the two stripper head support devices shown axially downwardly spaced from its attachment hardware, and with an axially exploded partial cross-sectional view of the other stripper head support device;

FIG. 6 is a cross-sectional end view of the stand-off leg of one of the stripper head support devices of FIG. 5, taken along line 6-6 of FIG. 5, and showing a magnet received in a cylindrical bore formed in the stand-off leg.

DETAILED DESCRIPTION

Figure 1:
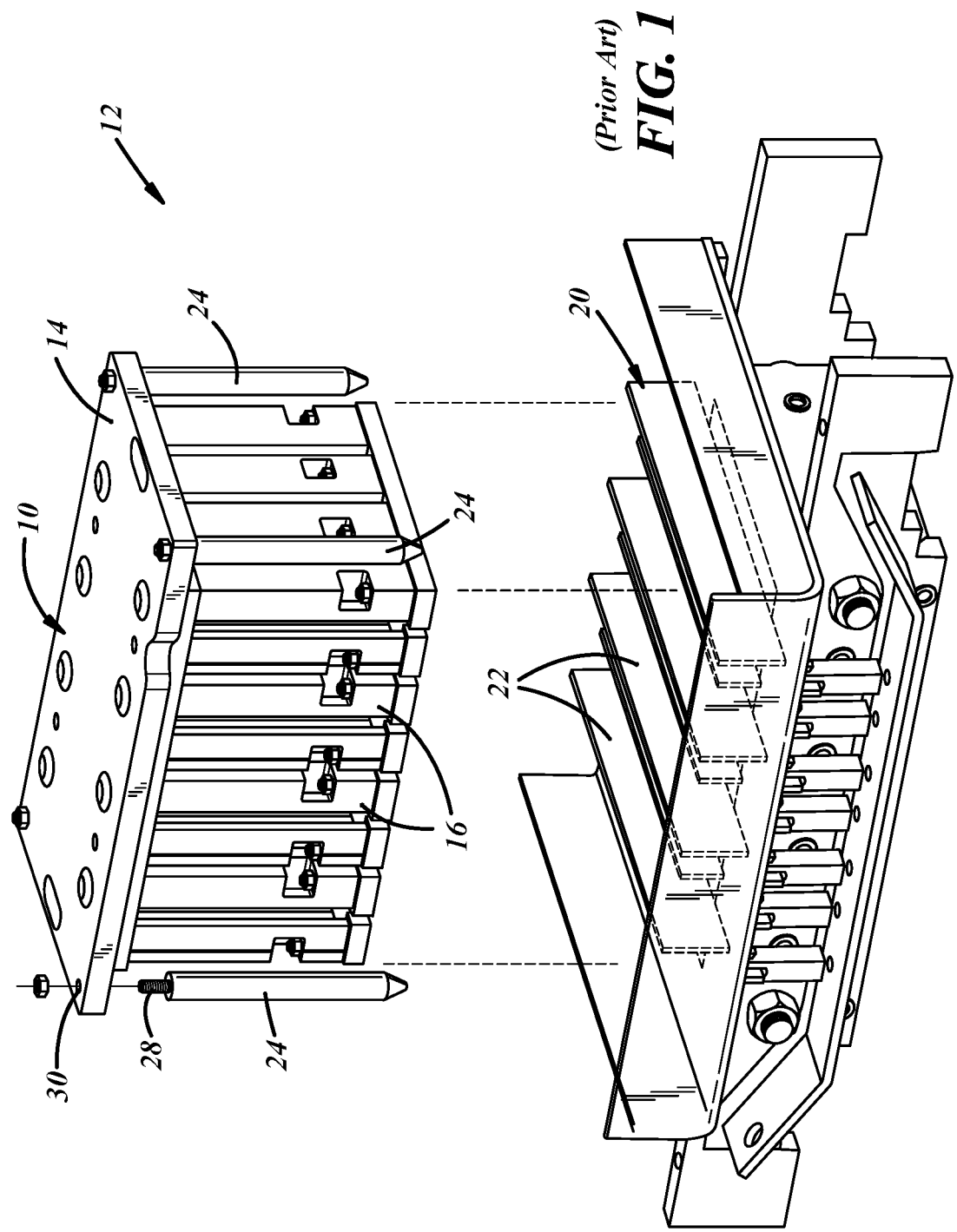
Figure 2:
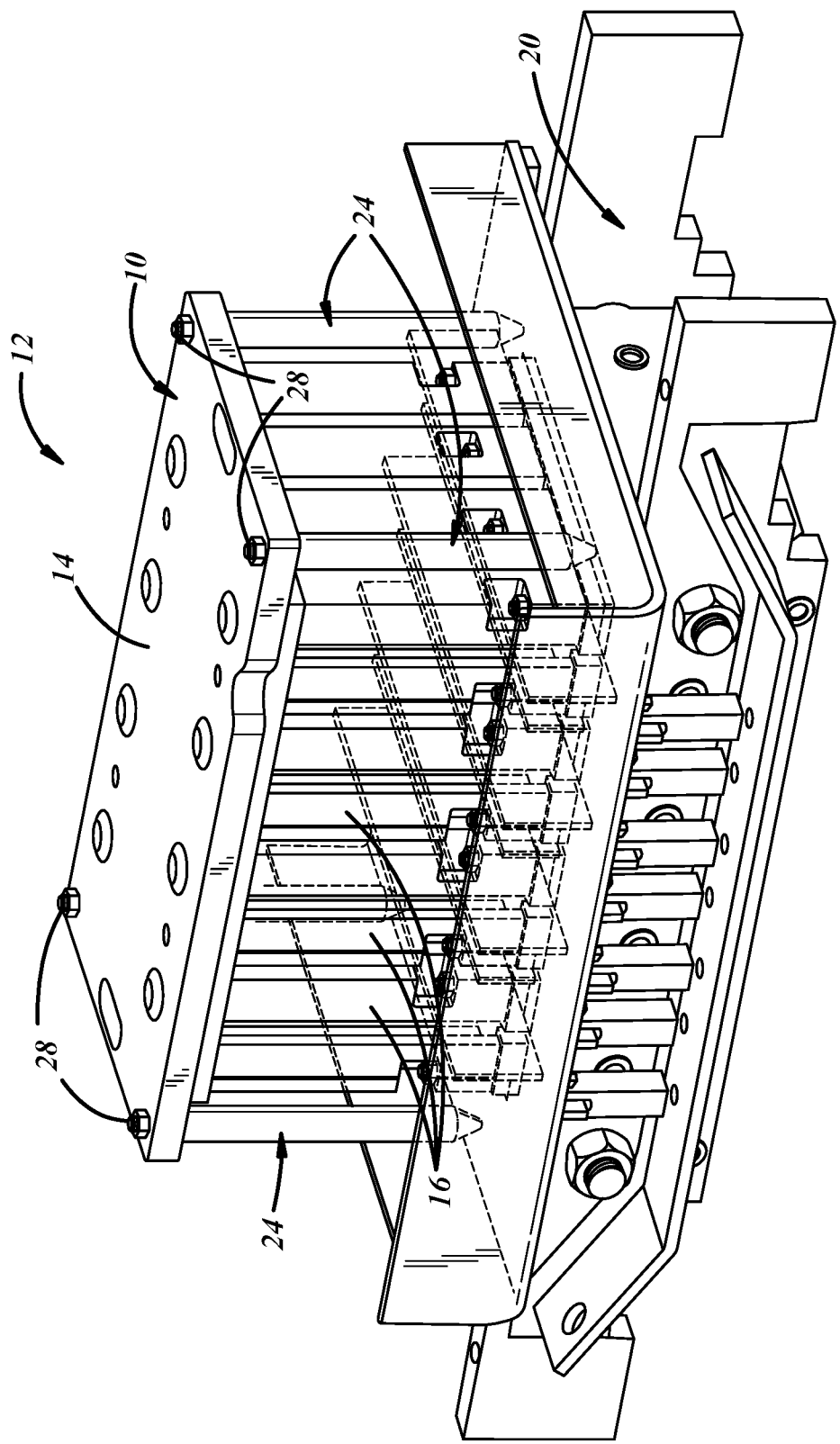
Figure 3:
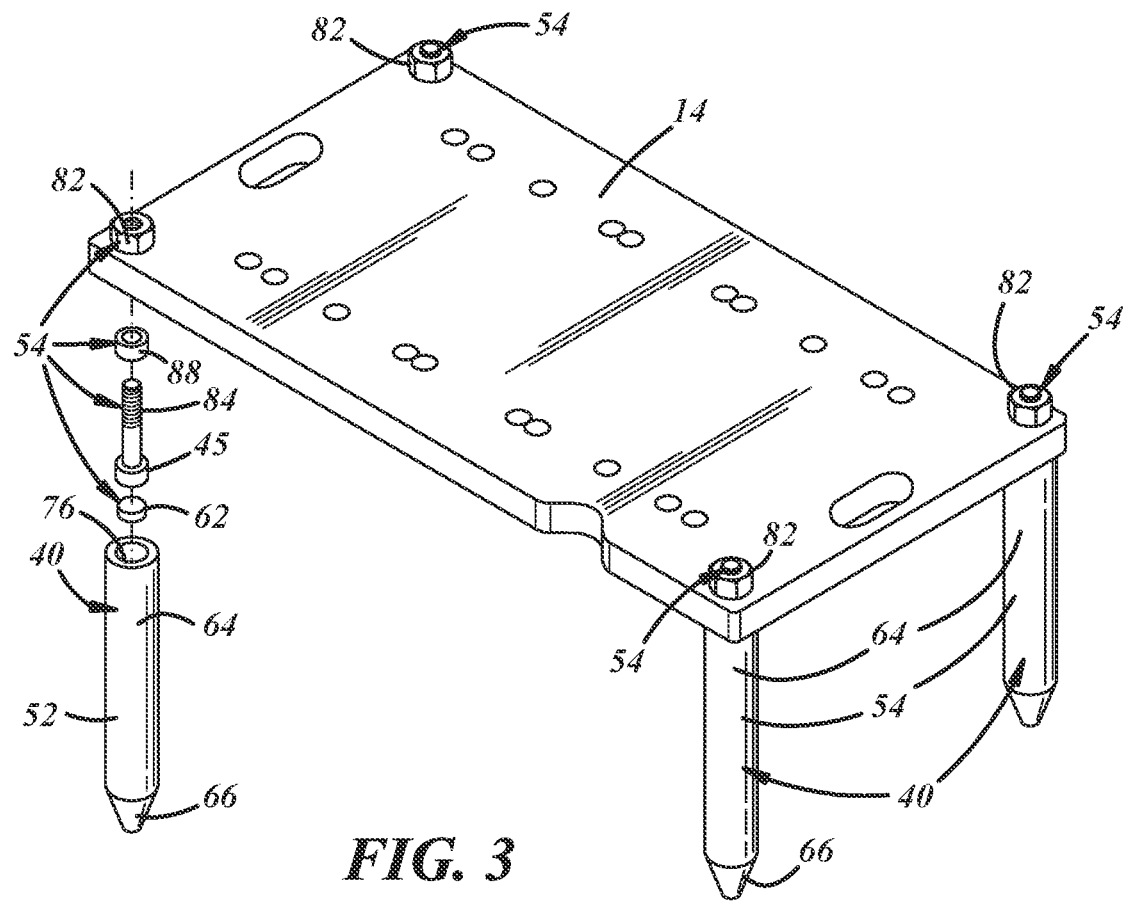
Figure 4:
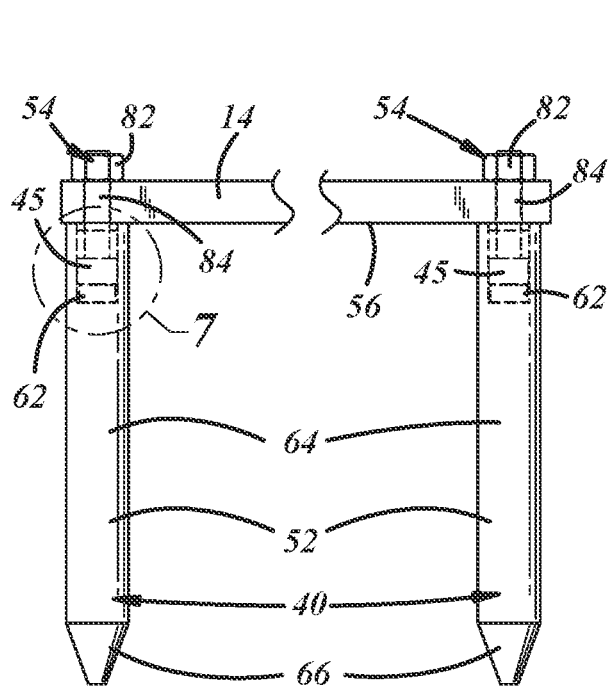
FIG. 4 is a fragmentary front view of the stripper head plate and stripper head support devices of FIG. 3.

Four concrete product machine mold assembly stripper head support devices are generally indicated at 40 in FIGS.

3-7. The stripper head support devices 40 may be employed to support a stripper head 10 of a concrete product machine mold assembly on a mold box 20 of the mold assembly in a position that facilitates removal of the mold assembly from a concrete product machine, as well as transport and storage of the removed mold assembly.

A concrete product machine mold assembly stripper head 10 that is to be supported by the stripper head support devices 40 may comprise a stripper head plate 14 and one or more stripper head plungers 16 supported on and extending downwardly from the stripper head plate 14. A concrete product machine mold assembly mold box 20 upon which the stripper head support devices 40 are to support such a stripper head 10, may have one or more mold cavity plunger receptacles 22 for receiving the stripper head plungers 16 when the stripper head 10 is lowered into a working position relative to the mold box 20.

Each of the stripper head support devices 40 may include a stand-off leg 52 and may also each include a set of leg attachment hardware 54 that may be removably attachable to a stripper head plate 14 with a ferrous metal portion 45 of the attachment hardware set 54 disposed or extending below an underside 56 of the stripper head plate 14. The stand-off legs 52 may be removably attachable to their respective leg attachment hardware sets 54 such that, in respective installed positions, the stand-off legs 52 extend downwardly from the stripper head plate 14 in respective positions to engage the mold box 20 of a concrete product machine and support the stripper head 10 of the machine on the mold box 20 in a position with the stripper head plate 14 spaced above an upper surface of the mold box 20 and with the plungers 16 disposed in respective protected positions within the respective plunger receptacles 22 of the mold box 20.

Each leg attachment hardware set 54 may include, in addition to the ferrous metal portion 45, a magnetic portion 62. The magnetic portions 62 of the leg attachment hardware sets 54 may be carried by and fixed to the stand-off legs 52 to provide for removable magnetic attachment of the stand-off legs 52 to the respective ferrous metal portions 45 of the leg attachment hardware 54.

Each stand-off leg 52 may comprise an elongated, generally cylindrical, shaft 64 that may have a generally conical tip 66 at a lower end of the shaft 64. The magnetic portions 62 of the leg attachment hardware sets 54 may be carried by the stand-off legs 52 in respective positions adjacent respective upper ends of the stand-off leg shafts 64.

Figure 7:
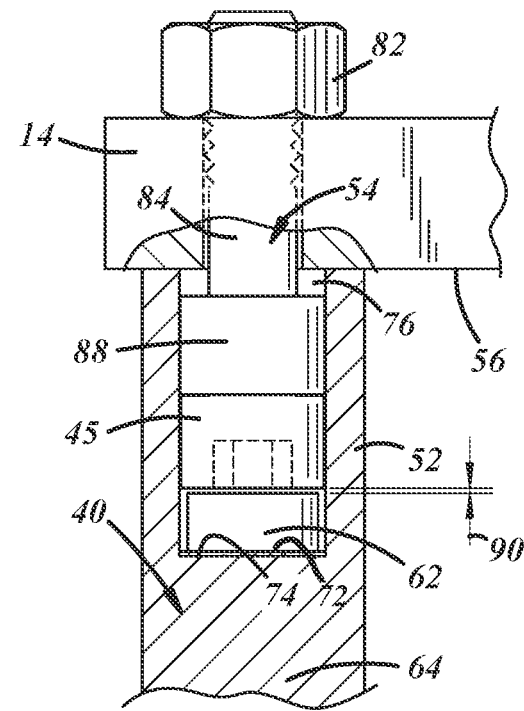
FIG. 7 is a fragmentary magnified partial cross-sectional front view of the stripper head plate and one of the stripper head support devices of FIG. 3.

As best shown in FIG. 7, the magnetic portion 62 carried by each stand-off leg 52 may comprise a disk-shaped magnet that may be connected by any suitable means, including magnetic force generated by its own magnetic field, to a floor surface 74 of a generally cylindrical recess or bore 76 formed in the upper end of the shaft 64 of the stand-off leg 52. Where the magnet 62 is retained by magnetic force against the floor surface 74, at least a portion of the stand-off leg 52 may comprise ferrous metal and/or magnetic or magnetized material. A layer of silicone 72 may be applied to the floor surface 74 before inserting the magnet, to prevent magnet damage that might otherwise result from the magnet impacting the floor surface 74 after being dropped into the bore 76. Each magnet 62 may comprise natural and/or artificial or manufactured magnetic material and may be 1 inch in diameter, ½ inch thick, and may have a 351*b* holding force.

The recess 76 in each stand-off leg 52 may be shaped to receive a corresponding ferrous metal portion 45 of one of the leg attachment hardware sets 54 into an engaged position in which the ferrous metal portion 45 is magnetically engaged by the magnet 62 with sufficient force to removably retain the stand-off leg 52 on the ferrous metal portion 45 of the leg attachment hardware set 54 and, thus, on the stripper head plate 14 on which the ferrous metal portion 45 is carried.

The ferrous metal portion 84 of each leg attachment hardware set 54 may comprise a socket head cap screw 84 having a screw head 45 shaped to be received into the engaged position in one of the recesses 76 formed in the upper ends of the shafts 64 of the stand-off legs 52. The socket head cap screw 84 included in each leg attachment hardware set 54 may be of any suitable dimensions and composition to include a 0.750-10×3.000" black oxide cap screw.

The leg attachment hardware 54 may further comprise a nut 82 that threadedly engages a threaded shaft of the socket head cap screw 84 when the screw 84 extends through a receiving hole formed in a stripper head plate 14. The leg attachment hardware 54 may also include a sleeve 88 that may be disposed around the cap screw shaft 84 and between the head 45 of the cap screw 84 and the stripper head plate 14. An outer diameter of the sleeve 88 may approximately equal that of the head 45 of the socket head cap screw 84. The sleeve 88 spaces the head 45 of the socket head cap screw 84 from the stripper head plate 14, allowing the bore 76 to be deeper, thus receiving a greater length cap screw and sleeve, resulting in a more stable attachment of the stand-off leg 52 to a stripper head plate 14.

As best shown in FIG. 7, each leg attachment hardware set 54 and the recess 76 of each stand-off leg 52 may be sized and shaped to leave an axial gap 90 between the magnetic portion 62 (e.g., the magnet) and the ferrous metal portion 45, (e.g., the cap screw) of the hardware set 54, when the stand-off leg 52 carrying the magnetic portion 62 is magnetically attached to a stripper head plate 14 via the cap screw 45. This prevents the magnets 62 from having to bear the weight of the stripper head 10. It also reduces the magnetic force holding the stand-off leg 52 to the ferrous metal portion 45 to a value that allows the magnetic portion 62 to remain attached to the stand-off-leg 52 when the stand-off leg 52 is removed from the ferrous metal portion 45 of the hardware set 54. The axial gap may be approximately ¹⁄₃₂". The magnet may be an uncoated Neodymium magnet, may have dimensions of approximately 1.000" diameter, 0.500" thick, and may have 35 lb. of holding force. However, in other embodiments the gap and the magnet specifications may be of any suitable values.

This description, rather than describing limitations of an invention, only illustrates one embodiment of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. A stripper head support device for supporting a stripper head of a concrete product machine mold assembly, on a mold box of the mold assembly, where the stripper head comprises a stripper head plate and stripper head plungers supported on and extending downwardly from the stripper head plate, and where the mold box has plunger receptacles for receiving the stripper head plungers when the stripper head is lowered into a working position relative to the mold box; the stripper head support device comprising:
   a stand-off leg; and
   a leg attachment that:

is configured to connect the stand-off leg to the stripper head plate in a position extending downwardly from the stripper head plate such that a lower end of the stand-off leg will engage an upper surface of the mold box of the mold assembly and support the stripper head on the mold box in a raised position above the working position, with the stripper head plungers disposed in respective protected positions within the respective plunger receptacles of the mold box, comprises a fastener attachable to the stripper head plate, and comprises a magnet fixed to either:

the fastener in a position to releasably magnetically engage a ferrous metal or magnetic portion of the stand-off leg; or the stand-off leg in a position to releasably magnetically engage a ferrous metal or magnetic portion of the fastener, and the stand-off leg being shaped to support the weight of the stripper head while keeping a gap between the magnet and the ferrous metal or magnetic portion of the fastener or stand-off leg.

2. A stripper head support device as defined in claim 1 in which the stand-off leg comprises an elongated shaft and carries the magnet in a position adjacent an upper end of the shaft.

3. A stripper head support device as defined in claim 1 in which the magnet is carried on a floor surface of a recess formed in an upper end of the stand-off leg.

4. A stripper head support device as defined in claim 3 in which the magnet is magnetically retained on the floor surface of the recess.

5. A stripper head support device as defined in claim 3 in which the recess is shaped to receive a portion of the leg attachment fastener into an engaged position in which the received portion is magnetically engaged by the magnet.

6. A stripper head support device as defined in claim 5 in which the leg attachment fastener comprises a socket head cap screw, a portion of which is shaped to be received into the engaged position in the stand-off leg recess.

7. A stripper head support device as defined in claim 5 in which the received portion of the leg attachment fastener and the stand-off leg recess are sized and shaped to leave the gap as an axial space between the magnet and the received portion of the fastener when the stand-off leg carrying the magnet is removably attached to the stripper head plate via magnetic attraction to the fastener.

* * * * *